INVENTOR.
MICHAEL J. LANNI

INVENTOR.
MICHAEL J. LANNI

INVENTOR.
MICHAEL J. LANNI
BY

ATTORNEY

United States Patent Office

3,466,935
Patented Sept. 16, 1969

3,466,935
VERTICAL GYRO ERECTION CONTROL SYSTEM AND METHOD FOR GYRO ERECTION LOOP CUTOFF
Michael J. Lanni, Ridgewood, N.J., assignor to The Bendix Corporation, a corporation of Delaware
Filed July 25, 1966, Ser. No. 567,422
Int. Cl. G01c 19/30, 19/46
U.S. Cl. 74—5.41                       16 Claims

ABSTRACT OF THE DISCLOSURE

Means and method for effecting a cutoff of an erection system of a gyroscope to eliminate errors induced in the erection system due to acceleration of an aircraft in fore-aft and in turning maneuvers during flight of the aircraft. A pitch pendulum synchro means or a bank pendulum synchro means is disconnected from the erection system whenever excessive acceleration conditions occur.

---

This invention relates to improvements in a vertical gyro erection control system and in a method for gyro erection loop cutoff, and more particularly to a system for the elimination of gyro erection system errors due to acceleration of an aircraft in turning and in fore-aft maneuvers and to a method for establishing a threshold for disconnecting both pitch and roll sensitive pendulums or level sensor devices from the control of the torque motors operable in a conventional manner to right the gyro during aircraft maneuvers.

The problem of minimizing the vertical error in an aircraft gyroscopic reference is a primary concernment, particularly in a reference that utilized pendulous or level sensor devices to sense and erect the gyro to the earth's gravitational field, such as in a first order erection system. In order to minimize the vertical error more complex systems have been devised as described and claimed in U.S. Patent No. 3,226,986, granted Jan. 4, 1966, to Christopher A. Rafferty, and in a copending U.S. application Ser. No. 290,049, filed June 24, 1963, by Christopher A. Rafferty, both assigned to The Bendix Corporation, the assignee of the present invention.

In a vertical gyroscope carried by an aircraft in flight, pendulum or level sensor errors are caused by changes in the aircraft velocity in a horizontal plane and exist, therefore, during fore-aft accelerations and during turns of the aircraft. Fore-aft accelerations affect the pitch sensor errors while turns cause roll sensor errors. Under these conditions, the pendulums or level sensor devices would "erect" the gyro gimbals to a false or dynamic vertical corresponding to the gravitational forces applied.

Verticality errors in such a pendulum or level sensor controlled erected vertical gyro in all flight conditions may be categorized into two groups:

(1) Pendulum or level sensor errors,
(2) Gyro errors.

Pendulum or level sensor errors are caused by changes in aircraft velocity in a horizontal plane and exist, therefore during fore-aft accelerations and during turn accelerations in the maneuvers of an aircraft. Fore-aft accelerations affect the pitch angle sensor and turns cause roll sensor errors. Under these conditions, the pendulous or level sensor operating means would "erect" the gimbals to a false dynamic vertical. Since these errors affect only the erection control means, minimization of the error in vertical indication may be accomplished by disconnecting either or both the pitch or bank pendulous level sensor operating means when horizontal accelerations in excess of predetermined values are present. These cutouts are of the following form:

$$\text{Turn acceleration} = V\dot{\psi}$$
$$\text{Fore-aft acceleration} = |\dot{V}|$$

where:
$V$ = aircraft ground speed
$\dot{\psi}$ = rate of turn (heading change)

Since these acceleration forces primarily effect pendulum or level sensor errors in the gyro erection system, an object of the present invention is to provide a novel means and method whereby a reduction in the resultant vertical error may be accomplished by disconnecting either or both pendulums or level sensor from their corresponding erection torquer when such horizontal accelerations exceed a predetermined critical value.

Heretofore, users of this type of pendulous or level sensor erection control equipment have done one of the following, depending upon the accuracy of the vertical indication required:

(1) Accept the resultant gyro error about the pitch axis due to longitudinal acceleration of the aircraft and without disconnecting the pitch pendulum or sensor.

(2) Upon lateral acceleration effectively disconnect the roll pendulum or sensor by operation of either an external gyroscopic rate of turn switch, or an electrolytic angle detector.

(3) Disconnect either the pitch or the roll pendulums or sensors or both by operation of electrolytic angle detector switches.

An object of the present invention is to provide a novel means and method of establishing an accurate threshold to disconnect either the pitch or bank erection system, or both, whenever the aforementioned excessive accelerational conditions occur.

Another object of the invention is to provide in such a disconnect, a novel means and method for utilizing or sharing a feedback signal of a rate generator as a second function thereof to operate the disconnect simultaneously with its initial speed responsive antihunting function in a repeater servo of an aircraft speed or turn control system or indicator.

Another object of the invention is to provide in such an accurate threshold disconnect, a novel means and method for reducing the complexity of the gyro erection control mechanism of the previous systems heretofore in use, such as the prior gimbal mounted electrolytic cutoff switches.

Another object of the invention is to provide a novel pitch erection control loop in which a cutoff signal is derived from a rate feedback generator in a velocity repeater servo system.

Another object of the invention is to provide a novel roll erection control loop in which a cutoff signal is derived from a rate feedback generator in a directional repeater servo system.

Another object of the invention is to provide a novel means and method for utilizing such a cutoff threshold signal whereby a low and more noise-free cutoff threshold is accomplished by a proper selection of the rotational range and signal to noise ratio of the rate generator.

In practices heretofore followed to detect resultant errors in the dynamic vertical of the gyro, there were provided gimbal mounted low angle set electrolytic cutoff switches the mechanical accuracy of which required that the cut off angles of the dynamic vertical be not set below four degrees, equivalent to accelerational forces of not less than .07 g and because of this mechanical limitation in the operating range of the switches, the erection control loop did not disconnect the erection pendulum or sensor during some landing profiles that are typical of present aircraft operating procedures in which excessive acclerational forces may arise. Thus an object of the present invention is to provide a novel system and method whereby the erection cut off may be electrically more accurately set to be brought into operation under excessive accelerational forces as low as a .017 g threshold.

Another object of the invention is to provide in such an erection control system a novel means and method in which the cutoff control voltage generated is in the form of a derivative of the velocity of the flight of the aircraft and which has the advantage of tracking directly in magnitude and time phase the accelerating forces acting on the aircraft, rather than being dependent upon the resultant angular position of the gyro spin axis as in the case of the heretofore utilized gimbal mounted cutoff switches.

Another object of the invention is to provide a novel means and method for simultaneous utilization of a rate signal from a generator in an aircraft velocity or heading repeater servo to effect: (1) stabilization of the repeater servo; and (2) actuate a cutoff relay through a buffer amplifier so as to disconnect a vertical gyro erection pendulum or level sensor control means when the input to the buffer amplifier exceeds a preset threshold indicative of excessive accelerational forces acting on the aircraft due to change of velocity or heading thereof.

Another object of the invention is to provide a novel means and method for generating a rate of change of velocity signal which is effective to control the cutoff of a pitch pendulum or sensor erection system when excessive acceleration conditions arise.

Another object of the invention is to provide a novel means and method for generating a rate of change of heading signal which is effective to control the cut off of a roll pendulum or sensor erection system when excessive accelerational conditions arise.

Another object of the invention is to provide a novel method and means of sensing acceleration forces acting on a pendulum or level sensor erection control system for a gyroscope so as to cut out of operation the pendulum or level sensor control system under excessive accelerational forces.

Although several embodiments of the invention have been illustrated and described, various changes in the form and relative arrangement of the parts which will now appear to those skilled in the art may be made without departing from the scope of the invention. Reference is, therefore, to be had to the appended claims for a definition of the limits of the invention.

In the drawings in which corresponding numerals indicate corresponding parts in the several drawings:

FIGURE 1 is a schematic illustration of a part of an erection control system embodying the invention and including a vertical gyroscope and an erection system operable therefor under flight conditions of an aircraft.

FIGURE 2 is a schematic illustration of a second part of the erection control system embodying the invention and including a velocity repeater servo system and a directional repeater servo system together with rate feedback generators operable in the systems to stabilize the systems and to provide voltage signals as derivatives, respectively, of rate of change in the airspeed and direction of the aircraft to operate cut off relays of FIGURE 1 to disconnect a pitch pendulum synchro means and a bank pendulum synchro means from the erection control system under excessive accelerational conditions. The complete control system embodying the invention is illustrated by combining the schematic illustration of FIGURE 2 with that of FIGURE 1.

Figure 1:
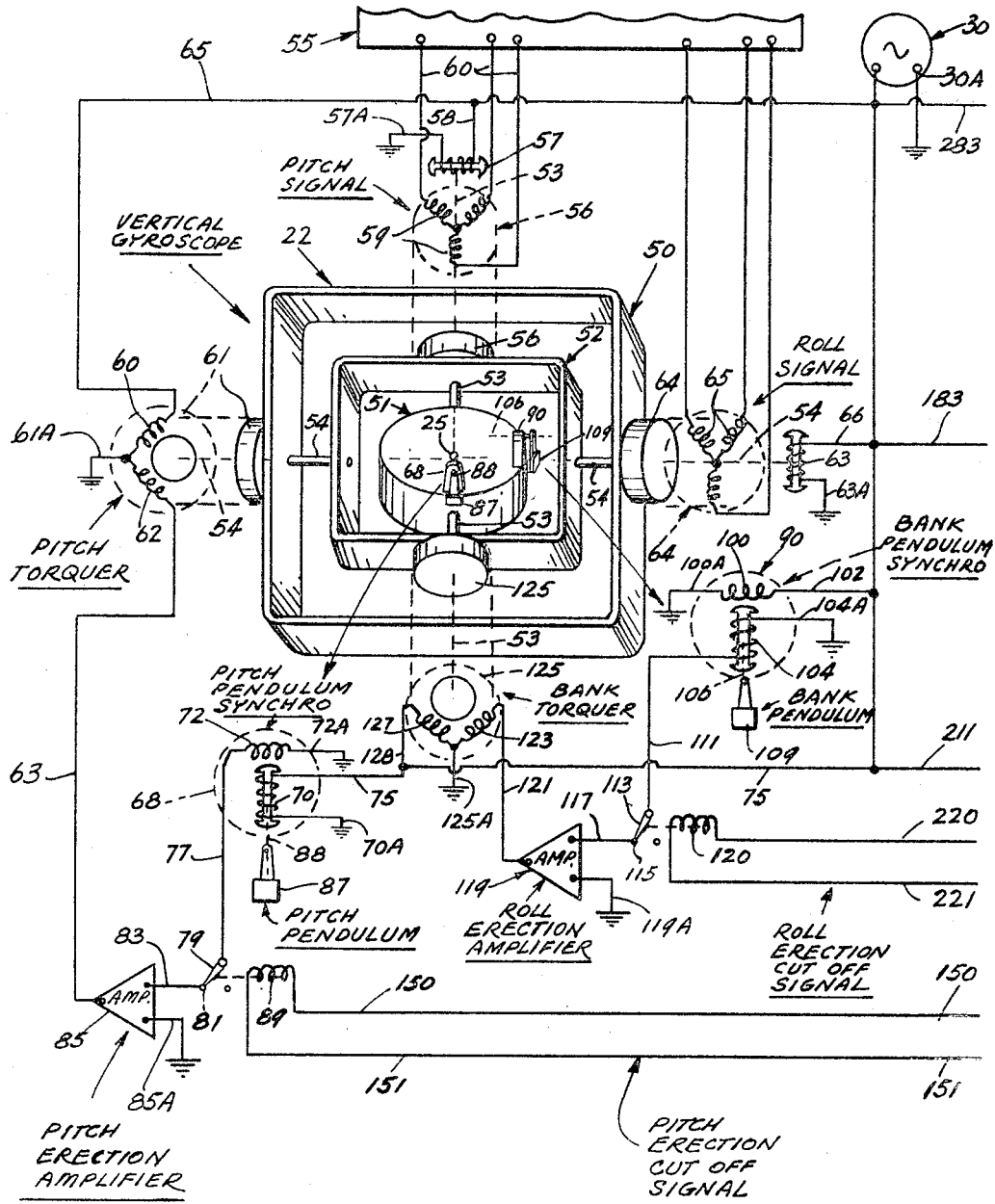

Referring to the drawing of FIGURE 1, there is shown a vertical gyro 22, of conventional type, mounted in a case 50, carried by an aircraft and including a normally vertically extending gyro rotor spin axis 25. The gyro 22 further has pitch and bank gimbals 51 and 52, moveable angularly about mutually perpendicular axes including pitch axis shaft 53 and bank axis shaft 54. The vertical gyro 22, further includes a pitch inductive device such as a pitch sensor synchro 56, mounted on the gimbal 52, and positioned coaxially with respect to the pitch axis shaft 53 of the vertical gyro 22. The synchro has a rotor winding 57 mechanically connected to the inner pitch gimbal 51 through the shaft 53 and inductively coupled to stator windings 59 mounted in a housing mechanically connected to the outer bank gimbal 52. The rotor winding 57 is connected by a conductor 58, to one terminal of a suitable source of alternating current 30, having an opposite terminal 30A connected to ground, while an opposite terminal of the rotor winding 57 is connected to ground by a conductor 57A. The stator windings 59 are connected in a conventional manner through electrical conductors 60 to an electrical control system for the aircraft and pitch indicator 55 operable in a conventional manner.

The vertical gyro 22 also includes a bank inductive device such as a bank sensor synchro 64 mounted coaxially with respect to the bank axis shaft 54 of the vertical gyro 22. The synchro 64 has a rotor winding 63 mechanically connected through the bank axis shaft 54 to the outer bank gimbal 52 and stator windings 65 mounted in a housing mechanically connected to the gyro case or support 50. The rotor winding 63 has one terminal electrically connected by a conductor 66 to the source of alternating current 30 and an opposite terminal connected to ground by a conductor 63A.

A pitch torquer motor 61, which may be of a conventional reversible two-phase type, is mounted coaxially with respect to the shaft 54 and has a rotor mechanically connected to the shaft 54 and a fixed phase winding 60 and a control winding 62 mounted in a casing mechanically connected to the support 50. The control winding 62 of the torquer motor 61 is electrically connected to a gyro stabilized pitch reference synchro means 68 through a conductor 63 and other control means, as hereinafter explained. The fixed phase winding 60 is connected to the source of alternating current 30 through a conductor 65 while a common terminal of the fixed phase winding 60 and the control winding 62 is connected to ground by a conductor 61A.

The gyro stabilized pendulous pitch reference synchro means 68 is of a conventional type having a casing mounted on the pitch gimbal 51 and a rotor winding 70 arranged so as to be angularly positioned from a null signal position to an inductive coupling position relative to a stator winding 72 mounted in the casing of the synchro means 68. Rotor winding 70 is electrically connected at one terminal through a conductor 75 to the source of alternating current 30 while an opposite terminal is connected to ground through a conductor 70A. The stator winding 72 has one terminal connected to ground through a conductor 72A while an opposite terminal is connected through a conductor 77 to a switch element 79, normally biased under spring tension into contacting relation with a contact 81 connected by an electrical conductor 83 to an input of a buffer amplifier 85 having a common grounded input-output terminal 85A and an opposite output terminal connected through the conductor 63 to the control winding 62 of the torquer 61. The rotor winding 70 is adjustably positioned relative to the stator winding 72 by a pitch pendulum 87 mechanically connected by a shaft 88 to the rotor winding 70. The shaft 88 extends in the casing of the synchro means 68 in parallel relation to the pitch axis shaft 53 of the gyroscope 22.

The pitch pendulum synchro means 68 is arranged with the pendulum operated rotor 70 having an axis of rotation 88 extending perpendicular to the spin axis 25 of the vertical gyro 22. The rotor 70 is adjustably positioned by the vertically extending pendulum 87 about the normally horizontally extending axis 88. When the aircraft is in level flight condition the pendulum 87 positions the rotor winding 70 to a null signal inducing relation to the stator winding 72 so that there is effected no output signal.

The arrangement is such then that upon the aircraft flight being in a predetermined level flight condition, the pendulum 87 will position the rotor winding 70 to a normal null signal relation to the winding 72. However, upon a tilt about the pitch axis of the gyroscope in one sense or the other relative to the predetermined null condition or in the spin axis 25 relative to true vertical, the pendulum 87 will adjust the rotor winding 72 through the shaft 88 so as to induce a voltage in the winding 72 of a phase dependent upon the sense of the tilt of the gyroscope from the null condition in a conventional manner.

This signal induced in the stator winding 72 is in turn applied through the buffer amplifier 85 and the output conductor 63 leading therefrom to the control winding 62 of the pitch torquer 61 of a phase sense such as to cause the torquer 61 to apply a torque to the bank axis shaft 54 and thereby to the bank gimbal 52 so as to precess the pitch gimbal 51 about the pitch axis of the shaft 53 in a conventional manner to erect the spin axis 25 of the rotor of the gyro 22 to the vertical position. The sense of the torque applied by the torquer 61 will be dependent, of course, upon the out of null position of the rotor winding 70 of the pitch pendulum synchro means 68 as effected by the pendulum 87.

The switch element 79 is normally biased under spring tension into contacting relation with the switch contact 81 so as to connect the output winding 72 of the pitch pendulum synchro means 68 to the input of the amplifier 85. However, the switch element 79 is arranged to be actuated out of contacting relation with the contact 81 by the action of an elecromagnetic relay winding 89 upon sufficient energization thereof due to excessive fore-aft accelerational conditions arising, as hereinafter explained in greater detail, with reference to FIGURE 2.

The vertical gyro 22 also includes a gyro stabilized pendulous bank reference synchro means 90 of a conventional type having a casing mounted on the pitch gimbal 51 of the vertical gyro 22, and including mounted in the casing a stator winding 100 connected at one terminal by a conductor 102 to the source of alternating current 30 and at an opposite terminal to ground by a conductor 100A. A rotor winding 104 is mounted on a shaft 106 having an axis which extends in the casing of the synchro means 90 in parallel relation to the axis of rotation of the bank axis shaft 54 of the vertical gyro 22 and perpendicular to the spin axis 25 of the rotor of the vertical gyro 22.

The rotor winding 104 is adjustably positioned about the axis of the shaft 106 by a pendulum 109 affixed at one end to the shaft 106. The rotor winding 104 is electrically connected at one terminal to ground by a conductor 104A and at an opposite terminal by a conductor 111 to a switch element 113 normally biased under spring tension into contacting relation with a switch contact 115. The switch contact 115 is in turn electrically connected through a conductor 117 to an input terminal of a buffer amplifier 119 having a common grounded input-output terminal 119A and an opposite output terminal connected by an electrical conductor 121 to one terminal of a control winding 123 of a torquer motor 125. The bank torquer motor 125, which may be of a conventional reversible two-phase type, is mounted coaxially with respect to the shaft 53 and has a rotor mechanically connected to the shaft 53 and a fixed phase winding 127 connected at one terminal by a conductor 128 to the source of alternating current 30. The control winding 123 and fixed phase winding 127 have an opposite common grounded terminal 125A.

Further, it will be noted that while the switch element 113 is normally biased under spring tension into contacting relation with the contact 115, the switch element 113 may be actuated out of contacting relation with the contact 115 by the operation of an electromagnetic relay winding 120 upon sufficient energization thereof due to excessive accelerational conditions arising during a turning maneuver of the aircraft, as hereinafter explained in greater detail.

The arrangement of the bank pendulum synchro 90 is such that when the spin axis 25 is in a normal vertical condition, the rotor winding 104 will induce no signal in the stator winding 100 while upon a tilt of the gyroscope about the bank axis in one sense or the other, the pendulum 109 will cause the rotor winding 104 to be adjusted into an inductive coupling relation to the stator winding 100 so as to effect an output signal therein which is applied through the output conductor 111, switch element 113, contact 115, buffer amplifier 119, output conductor 121, to effect energization of the control winding 123 of the torquer motor 125 with an electrical signal of a phase dependent upon the sense of the bank of the gyroscope to apply a torque to the shaft 53 to cause the vertical gyro to precess about the bank axis of the shaft 54 in a conventional manner so as to bring spin axis 25 of the gyro rotor to the normal vertical position.

The operation of the pitch torquer 61 in response to the controlling signals effected by the pitch pendulum synchro means 68, as well as the operation of the bank torquer 125 in response to the controlling signals effected by the bank pendulum synchro 90 is in a conventional manner.

The feature of the present invention resides in the novel means and method herein provided for establishing an accurate threshold to disconnect either the pitch pendulum synchro means 68 or the bank pendulum synchro means 90, or both, from the erection control system, whenever excessive acceleration conditions occur, as hereinafter explained in greater detail. In this connection, it should be borne in mind that the pendulums 87 and 109 utilized to sense a deviation from a predetermined level flight condition, cause the synchros 68 and 90 controlled thereby to generate signals to correct the orientation of the gyro. The pendulums are gravity operated and thus sensitive to acceleration of the aircraft in the horizontal plane.

Normally in a vertical gyro, pendulum sensor errors are caused by changes in the aircraft velocity in a horizontal plane and have come into effect during fore-aft accelerations of the aircraft and during the generation of accelerational force due to turning maneuvers of the aircraft. Thus fore-aft accelerations effect pitch sensor errors while accelerated turns of the aircraft cause bank sensor errors. Under excessive accelerations then, the pendulums 87 and 109 would in the absence of the present invention cause torquer motors 61 and 125 controlled thereby to "erect" the gyro gimbals to a false dynamic vertical corresponding to the gravitational forces applied thereto. As explained hereafter in greater detail, the cut off signals which cause energization of the respective electromagnetic relay windings 89 and 120, of the present invention to cause actuation of switch elements 79 and 113 so as to cut out of operation the pitch pendulum synchro means 68 and the bank pendulum synchro means 90, are derived, respectively, from a rate feedback generator in the velocity repeater servo and from another rate feedback generator in a heading repeater servo and which signals also serve to stabilize the respective repeater servos, as hereinafter explained, with reference to FIGURE 2.

MEANS AND METHODS FOR GYRO ERECTION LOOP CUTOFF

Figure 2:
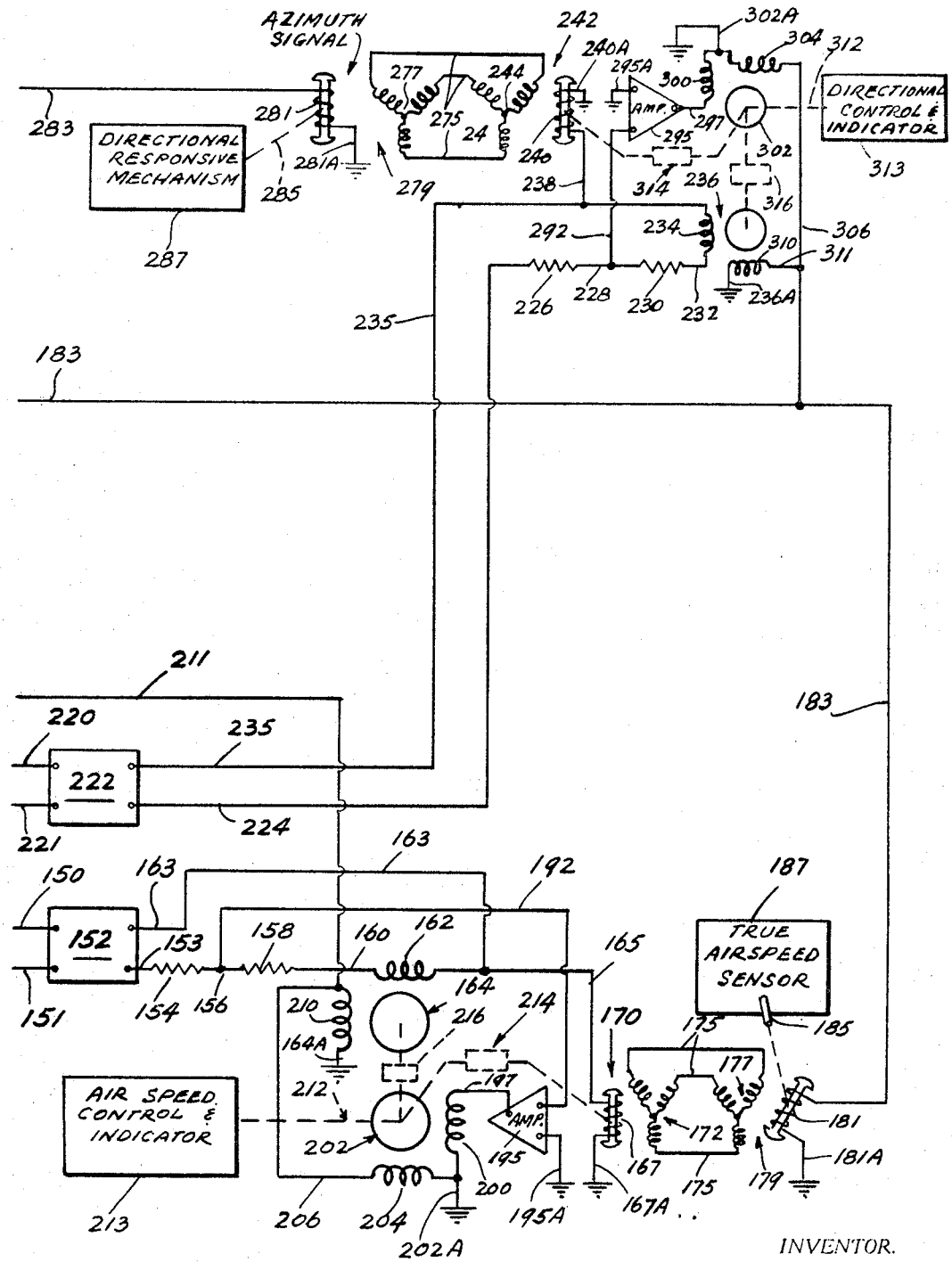

As shown by the wiring diagram of the drawing of FIGURE 2, the pitch erection cutoff relay winding 89 is connected through conductors 150 and 151 to output terminals of a buffer amplifier 152, having one input terminal connected by a conductor 153, resistor 154, conductor 156, resistor 158, and conductor 160, to one terminal of an output winding 162 of a rate generator 164. The output winding 162 has an opposite terminal connected through a conductor 163 to the opposite input terminal of the buffer amplifier 152. The rate generator 164 is of a conventional type to provide an output signal to stabilize the velocity servo loop as well as control the actuation of the relay switch element 79.

In stabilizing the velocity servo loop, the opposite terminal of the output winding 162 of the rate generator 164 is also connected through a conductor 165 to one terminal of an output winding or rotor winding 167 of a follow up synchro 170 having an opposite terminal connected to ground by a conductor 167A. The follow up synchro 170 has stator windings 172 inductively coupled to the rotor winding 167 and connected through electrical conductors 175 to stator windings 177 of a signal transmitter synchro 179. The signal transmitter synchro 179 has a rotor winding 181 connected at one terminal through an electrical conductor 183 to the source of alternating current 30, and an opposite terminal connected to ground by a conductor 181A. The rotor winding 181 of the synchro 179 is adjustably positioned in relation to the stator winding 177 through a shaft 185, angularly positioned by a true airspeed sensing mechanism 187 in accordance with the prevailing airspeed of the aircraft in a conventional manner.

It will be further noted that the output signal applied by the true airspeed sensor 187 through the transmitter synchro 179 and follow up synchro 170 to the conductor 165 is in turn applied through the rate generator output winding 162, conductor 160, resistor 158 and conductor 156, to a conductor 192 leading therefrom to an input terminal of a signal amplifier 195 having an opposite input-output terminal connected to ground by a conductor 195A. The amplifier 195 has in turn an output conductor 197 leading to one terminal of a control winding 200 of a reversible variable speed two phase motor 202 of a conventional type having a fixed phase winding 204 connected at one terminal by a conductor 206 leading to the source of alternating current 30. Other terminals of the control winding 200 and fixed phase winding 204 are connected to ground by a common conductor 202A. The fixed phase winding 210 of the rate generator 164 is also connected at one terminal through a conductor 211 to the source of alternating current 30 and at an opposite terminal to ground by a conductor 164A.

The servo motor 202 is arranged to rotate at a speed and in a direction dependent upon the amplitude and phase sense of the controlling signal applied to the output conductor 165 by the follow up synchro 167 and to drive through a shaft 212 an airspeed indicator and airspeed control 213 for the aircraft and which may be operable in a conventional manner.

Further, the motor 202 drives through a gearing 214 the rotor winding 167 of the follow up synchro 170 to a null signal position relative to stator windings 172 and through a gearing 216, the rotor of the rate generator 164 at a speed proportional to the rate of change in the velocity or airspeed of the aircraft so as to provide at the output winding 162 of the rate generator 164, a voltage having an amplitude proportional to the speed of rotation of the servo motor 202 and of an opposite phase to that of the controlling signal voltage applied to the output conductor 165 by the followup synchro 170 so as to provide an opposing or antihunting effect tending to stabilize the operation of the servo motor 202 in the velocity servo loop, in a conventional manner.

The arrangement, however, is such that the servo motor 202 positions the rotor of the rate generator 164 at a speed proportional to the rate of change in the airspeed or velocity of the aircraft to provide at the output winding 162 an output signal voltage which, in addition to providing a stabilizing effect on the velocity servo loop, is also applied through the buffer amplifier 152 to the cut off relay winding 89 as a derivative of the rate of change in the airspeed of the aircraft. Upon the airspeed of the aircraft changing at a rate in excess of a predetermined critical threshold value, the output voltage from the rate generator 164 applied to the input of the amplifier 152 and thereby to the cutoff relay winding 89 effects then a sufficient energization of the electromagnetic relay winding 89 to actuate the switch element 79 out of contacting relation with the switch contact 81 to thereby effectively cut off the operation of the pitch pendulum synchro means 68 in relation to the pitch torquer 61. Further, upon the fore-aft acceleration of the aircraft decreasing below the critical threshold value, the switch element 79 is thereupon biased under spring tension into contacting relation once again with the switch contact 81 so as to operatively connect the pitch pendulum synchro means 68 into normal operating relation with the pitch torquer 61.

Thus it will be seen that the rate signal from the generator 164 serves to stabilize the velocity servo loop including the amplifier 195, the servo motor 202 and the followup control synchro 170, while effectively energizing the pitch cutoff relay winding 89 through the buffer amplifier 152 so as to thereby disconnect the pitch pendulum synchro means 68 when the input to the buffer amplifier 152 exceeds a preset threshold value in response to the fore-aft accelerational forces acting upon the aircraft and thereby on the true airspeed sensor 187.

It will be further noted that the bank cutoff electromagnetic winding 120 is connected through electrical conductors 220 and 221 to output terminals of a buffer amplifier 222, which in turn has one input terminal connected by a conductor 224, resistor 226, conductor 228, resistor 230 and conductor 232 to one terminal of an output winding 234 of a rate generator 236. The opposite terminal of the output winding 234 is connected through a conductor 235 to the opposite input terminal of the buffer amplifier 222. The rate generator 236 is of a conventional type and has the opposite terminal of the output winding 234 also connected through a conductor 238 to one terminal of a rotor winding 240 of a followup synchro 242 having an opposite terminal connected to ground at 240A. The followup synchro 242 has stator windings 244 inductively coupled to the rotor winding 240 and electrical conductors 275 leading therefrom to stator windings 277 of a signal transmitter synchro 279, having a rotor winding 281 inductively coupled thereto and connected at one terminal by a conductor 283 to the source of alternating current 30 and at an opposite terminal connected to ground by a conductor 281A. The rotor winding 281 is arranged to be adjustably positioned in relation to the stator windings 277 by a shaft 285 angularly positioned by a suitable directional responsive mechanism such as a compass or directional gyroscope 287 of conventional type.

The arrangement is such that a change in the heading of the aircraft will be sensed by the directional responsive mechanism 287 to effect an adjustment in the position of the rotor winding 281 of signal transmitter synchro 279 which will in turn cause a control signal to be induced in the rotor winding 240 of the followup transformer 242 which will in turn be applied through the conductor 238, the winding 234, conductor 232, resistor 230 and conductor 228 to a conductor 292 leading from the conductor 228 to an input terminal of a signal amplifier 295 having an opposite input-output terminal connected to ground by a conductor 295A. An opposite output terminal of the amplifier 295 is connected through a conductor 297 to a control winding 300 of a two phase motor 302 having a fixed phase winding 304 connected at one terminal by a conductor 306 to the source of alternating current 30. Opposite terminals of the control winding 300 and fixed phase winding 304 are connected to ground by a common conductor 302A. A fixed phase winding 310 of the rate generator 236 is also connected at one terminal through a conductor 311 to the source of alternating current 30 and at an opposite terminal through a conductor 236A to ground.

The servo motor 302 is arranged to rotate at a speed and in a direction dependent upon the amplitude and phase sense of the controlling signal applied to the output conductor 238 by the followup synchro 242 and to drive through a shaft 312 a directional indicator and directional control device 313 for the aircraft and which may be operable in a conventional manner.

Further, the motor 302 drives through a gearing 314 the rotor winding 240 of the followup synchro 242 to a null signal position relative to stator windings 244 and through a gearing 316, the rotor of the rate generator 236 at a speed proportional to the rate of change in the heading or rate of turn of the aircraft so as to provide at the output windings 234 of the rate generator 236 a voltage having an amplitude proportional to the speed of rotation of the servo motor 302 and of an opposite phase to that of the controlling signal voltage applied to the output conductor 338 by the followup synchro so as to provide an opposing or antihunting effect tending to stabilize the operation of the servo motor 302 in the velocity servo loop, in a conventional manner.

The arrangement, however, is such that the servo motor 302 positions the rotor of the rate generator 236 at a speed proportional to the rate of turn or rate of change in the heading of the aircraft to provide at the output winding 234 an output signal voltage which, in addition to providing a stabilizing effect on the heading servo loop, is also applied through the buffer amplifier 222 to the cut off relay winding 120 as a derivative of the rate of change in the turn or heading of the aircraft. Upon the heading of the aircraft changing at a rate in excess of a predetermined critical threshold value, the output voltage of the rate generator 236 applied to the input of the amplifier 222 and thereby to the cut off relay winding 120 effects then a sufficient energization of the electromagnetic relay winding 120 to actuate the switch element 113 out of contacting relation with the switch contact 115 to thereby effectively cut off the operation of the bank pendulum synchro means 90 in relation to the bank torquer 125. Further, upon the rate of turn or rate of change in the heading of the aircraft decreasing below the critical threshold value, the switch element 113 is thereupon biased under spring tension into contacting relation once again with the switch contact 115 so as to operatively connect the bank pendulum synchro means 90 into normal operating relation with the bank torquer 125.

Thus it will be seen that the rate signal from the generator 236 serves to stabilize the heading output repeater servo loop including the amplifier 295, the servo motor 302, and the followup control synchro 242, while effectively energizing the bank cut off relay winding 120 through the buffer amplifier 222 so as to thereby disconnect the bank pendulum synchro means 90 when the input to the buffer amplifier 222 exceeds a preset threshold value in response to the rate of turn or heading accelerational forces acting upon the aircraft and thereby on the directional sensor or directional gyro 287.

As heretofore described, there is provided in the invention a unique method and means for establishing an accurate threshold to disconnect either the pitch or bank erection networks or both whenever excessive accelerational conditions occur, and which include the following features:

A. The establishment of a lower and more noise-free cutoff threshold.
B. The mathematical form of the cutoff signal source is more truly representative of the acceleration forces acting on the vehicle.
C. There is utilized a feedback signal from a rate generator for an erection system cutoff function simultaneously with its initial function of stabilizing a servo repeater system.
D. The present invention reduces complexity of the gyro mechanism.

In the case of the pitch erection loop, the cutoff signal is derived from a rate feedback generator 164 in a velocity repeater servo and there are provided the following features:

(1) A low and more noise-free cutoff threshold is accomplished by proper selection of the rotational range and signal to noise ratio of the rate generator 164. In the prior practice involving low angle set electrolytic switches, cutoff angles of the dynamic vertical may not be set below 4° (equivalent to .07 g) due to mechanical limitations on the accuracy of the operating range of such switches. Because of this limitation, the pitch erection loop may not disconnect the pitch erection pendulum during some landing profiles that are typical of present aircraft operating procedures. However, with the system disclosed herein, pitch cutoff can be accomplished down to 1° (.017 g) threshold.

(2) The voltage generated by the rate generator 164 is in the form of the derivative of the aircraft's velocity V which has the advantage of tracking directly in magnitude and time phase the accelerating forces acting on the aircraft. Hence it is not effected by or dependent upon the angular position of the gyro spin axis 25 as in the case of the gimbal mounted cutoff switches of the prior art.

(3) A simultaneous utilization of the rate signal from the rate generator 164 to effect the following double functions:

(a) Stabilization of the velocity servo loop consisting of amplifier 195, servo motor 202 and follow up synchro 170.
(b) Actuate the pitch cutoff relay 79–89 through the buffer amplifier 152 for thereby disconnecting the pitch erection pendulum synchro means 68 when the input to amplifier 152 exceeds the preset threshold upon excessive accelerational forces acting on the aircraft.

In the case of the bank erection loop, the cutoff signal is derived from a rate feedback generator 236 in a heading output repeater servo and similar advantages are realized thereby, including the following:

(1) A reduction of complexity is obtained over present day gyros using gimbal mounted acceleration sensing devices in that the means for generating a rate of change in velocity signal is accomplished in an electronics unit, thereby improving reliability and maintainability of the gyro unit.

(2) Similarly, the novel aspects of this disclosure are evident in the roll erection loop. In this case, the heading output repeater servo is simultaneously used to develop the rate of change of heading signals which is applied to the buffer amplifier 220 and is used to actuate the roll cutoff relay 113–120 which in turn disconnects the roll erection pendulum synchro means 90.

Figure 3:
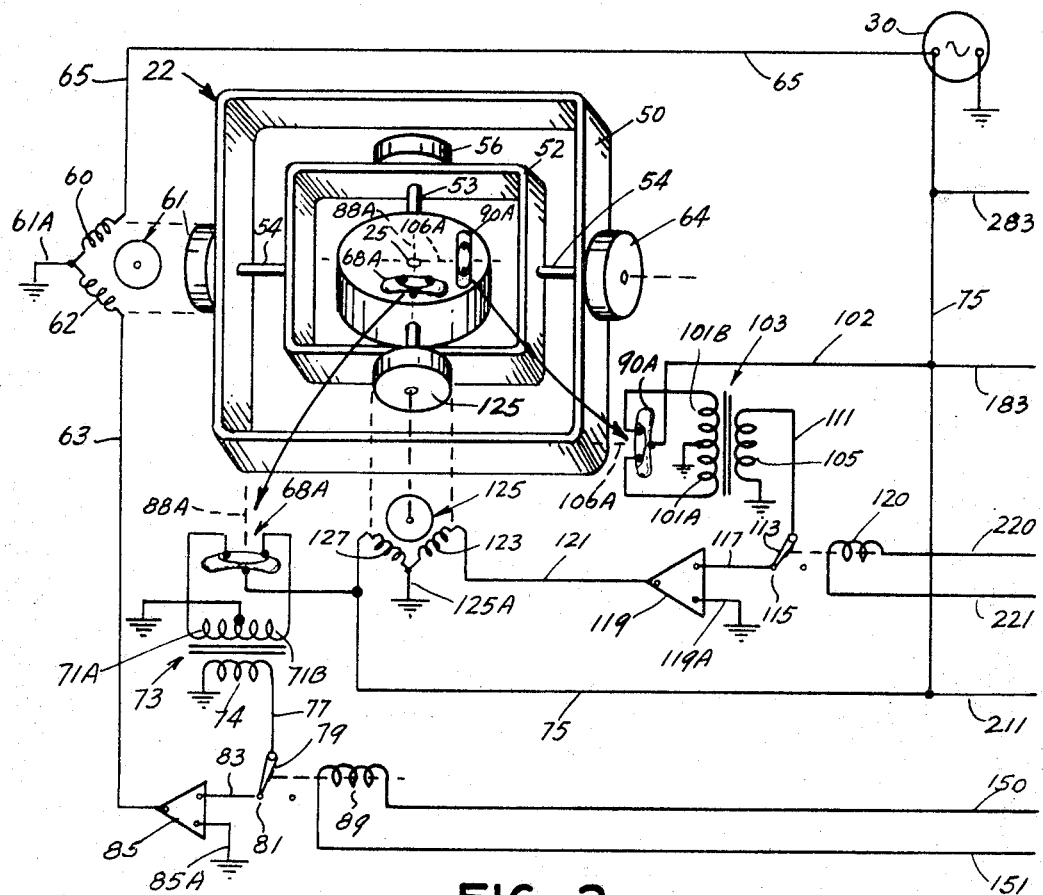
FIGURE 3 is a schematic illustration of a modified form of the invention as applied to the part of the erection control system of FIGURE 1 and showing a vertical gyroscope and an erection system including electrolytic level switches in place of the pitch and bank pendulum synchro means of FIGURE 1.

While in the form of the invention illustrated by FIGURE 1, the pitch and bank pendulum means 68 and 90 have been shown as of a conventional synchro type, there may be used in place thereof a pair of pitch and bank electrolytic level switches 68A and 90A, of conventional type, as shown in a modified form of the invention by FIGURE 3, to control the torquer motors 65 and 125. The electrolytic level switches 68A and 90A may be cut in and out of operation by the operation of the relays 79–89 and 113–120, in response to the actuating signals provided by the rate feedback generators 164 and 236 in the velocity repeater servo and heading output repeater servo, respectively. Thus the erection systems controlled thereby may be effectively cut out of operation by such actuating signals applied respectively as a derivative of the rate of change in the airspeed of the aircraft and as a derivative of the rate of change in the flight direction of the aircraft so that the cut off operation is not effected by, or dependent upon, the angular position of the gyro spin axis 25, as explained with reference to FIGURE 2.

In the form of invention of FIGURE 3, the electrolytic level switch 68A is mounted on the pitch gimbal 51 so as to be pivoted on an axis 88A extending parallel to the axis of rotation of the pitch axis of the shaft 53 and perpendicular to the spin axis 25 of the gyro rotor. The electrolytic level switch 68A is arranged to be angularly positioned from a null signal position so as to selectively control the effective application of the alternating current applied through conductor 75 from the source 30 to one or the other of the primary windings 70A and 70B of a coupling transformer 73 depending upon the tilt of the gyro and the relation of the spin axis 25 to the true vertical position. The alternating current signal thus selectively applied to the secondary windings 71A or 71B is then inductively coupled through the transformer 73 to the secondary winding 74 and through the conductor 77, switch element 79, conductor 83, amplifier 85 and conductor 63 to the control winding 62 of the pitch torquer 61 acting in a sense to apply a torque to the bank axis shaft 54 and thereby to the bank gimbal 52 so as to precess the pitch gimbal 51 about the pitch axis of the shaft 53, in a conventional manner, to erect the spin axis 25 of the gyro rotor to the vertical position. The sense of the torque applied by the torquer 61 will be dependent, of course, upon the out of null position of the electrolytic pitch sensor switch 68A and thus upon the position of the spin axis 25 in relation to the true vertical.

In the form of the invention of FIGURE 3, the relay switch element 79 is arranged to be actuated out of contacting relation with the contact 81 by the action of electromagnetic relay winding 89 upon sufficient energization thereof as upon excessive fore-aft acceleration conditions arising, as hereinbefore explained with reference to FIGURE 2.

The vertical gyro 22 also may include in the modified form of FIGURE 3, a gyro stabilized bank reference electrolytic level switch 90A of a conventional type mounted on the pitch gimbal 51 so as to be pivoted on an axis 106A extending parallel to the axis of rotation of the bank axis of the shaft 54 of the vertical gyro 22 and perpendicular to the spin axis 25 of the gyro rotor.

The electrolytic level switch 90A is so arranged that when the aircraft is in a normal level flight condition there will be no signal applied thereto from the alternating current source 30. However, upon the operating condition of the gyroscope being such as to cause the gyroscope spin axis 25 to tilt or bank in one sense or the other, the electrolytic level switch 90A will connect the electrical conductor 102 leading from the source of alternating current 30, to the primary winding 101A or 101B dependent upon the sense of the bank of the gimbal 52 from the level position and the angular relation of the spin axis 25 to the true vertical position.

The signal thus induced in the primary windings 101A or 101B will in turn be induced through the coupling transformer 103 to a secondary winding 105 and thereby through conductor 111, switch element 113, contact 115, conductor 117, amplifier 119 and output conductor 121 to the control winding 123 of the torquer motor 125 and acting in a sense to apply a torque to the pitch axis shaft 53 and thereby to the pitch gimbal 51 so as to precess the bank gimbal 52 about the bank axis of the shaft 54 in a conventional manner to erect the spin axis 25 of the gyro rotor to the vertical position.

The switch element 113 is arranged to be actuated out of a contact relation with the contact 31 by the action of an electromagnetic relay winding 120 upon sufficient energization thereof as upon an excessive rate of change in heading direction of the aircraft, as heretofore explained with reference to FIGURE 2.

Figure 4:
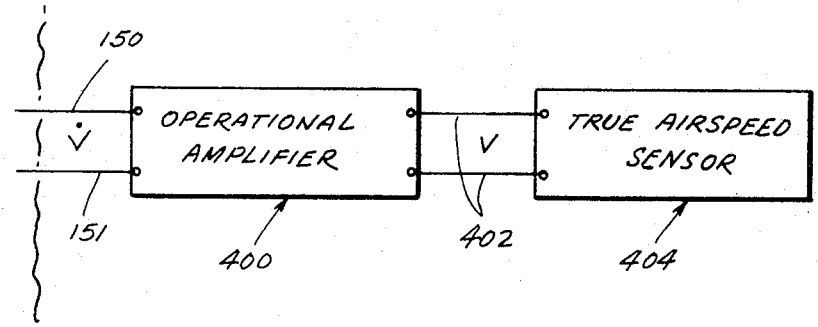
FIGURE 4 is a schematic illustration of a modified form of the invention as applied to the part of the erection control system of FIGURE 2 and showing a derivative device such as an operational amplifier in place of the velocity repeater servo and rate generator of FIGURE 2.

In the modified form of invention illustrated by FIGURE 4, there may be substituted for the velocity repeater servo, including the amplifier 195, motor 202 and rate generator 164, of FIGURE 2, an operational amplifier 400 of conventional type having an input connected by electrical conductors 402 to an output of a true airspeed sensor 400. The airspeed sensor 400 may be of a conventional type arranged to supply an output voltage V proportional to the sensed true airspeed of the aircraft. The operational amplifier 400 is also of a conventional type having an operational characteristic of supplying an output voltage V proportional to the rate of change in the input voltage V applied to the operational amplifier 400 by the true airspeed sensor 404.

It will be seen then, that there would be applied by the operational amplifier 400 across the output lines 150 and 151 leading therefrom a voltage proportional to the rate of change in the airspeed of the aircraft. Upon this rate of change reaching a predetermined threshold value the electromagnetic relay winding 89 will be sufficiently energized to actuate the switch element 79, shown in FIGURES 1 and 3, to an open circuit relation with the contact 81 so as to disconnect the erection system out of controlling relation with the torquer motor 61.

The invention, heretofore explained with reference to FIGURES 1, 2, 3 and 4, is equally applicable to separately packaged vertical and directional gyroscopes, as well as two and three gyro platforms.

Although several embodiments of the invention have been illustrated and described, various changes in the form and relative arrangement of the parts, which will now appear to those skilled in the art may be made without departing from the scope of the invention. Reference is, therefore, to be had to the appended claims for a definition of the limits of the invention.

What is claimed is:

1. For use in an aircraft a gyroscope erecting system of a type including a gyroscope having means mounting said gyroscope for pivotal movement about a pair of axes normal to each other, said gyroscope having a rotor with a spin axis normal to one of said first mentioned pair of axes, attitude sensor means mounted to pivot about an axis parallel to one of said first mentioned axes, electrical signal transmission means operably connected to be actuated by pivotal movement of said attitude sensor means about said axis parallel to said one axis to produce signals representing angular deviations of the spin axis from a predetermined relationship, torquer motor means, means interconnecting said signal transmission means to said torquer motor means, said torquer motor means being responsive to said signals and mounted to apply precessing torques to said gyroscope about said one axis so as to maintain the predetermined relationship of said spin axis; the improvement comprising cutoff means operatively connected in the interconnecting means to disconnect said electrical signal transmission means from said torquer motor means, means responsive to airspeed of the aircraft in fore-aft flight senses, and control means including a rate of change responsive means operable by the airspeed responsive means to render the cut off means effective upon the airspeed of the aircraft changing at a rate in excess of a predetermined threshold value.

2. For use in an aircraft a gyroscope erecting system of a type including a gyroscope having means mounting said gyroscope for pivotal movement about a pair of axes normal to each other, said gyroscope having a rotor with a spin axis normal to one of said first mentioned pair of axes, attitude sensor means mounted to pivot about an axis parallel to one of said first mentioned axes, electrical signal transmission means operably connected to be actuated by pivotal movement of said attitude sensor means about said axis parallel to said one axis to produce signals representing angular deviations of the spin axis from a predetermined relationship, torquer motor means, means interconnecting said signal transmission means to said torquer motor means, said torquer motor means being responsive to said signals and mounted to apply precessing torques to said gyroscope about said one axis so as to maintain the predetermined relationship of said spin axis; the improvement comprising cut off means operatively connected in the interconnecting means to disconnect said electrical signal transmission means from said torquer motor means, aircraft velocity condition responsive means, and control means including motor means operable at a speed proportional to rate of change in the sensed velocity condition of the aircraft, a rate generator having an output providing a voltage varying directly with the speed of the motor means and thereby with the rate of change in the sensed velocity condition, and means operatively connecting the output of the rate generator to the cutoff means to render the cutoff means effective upon the sensed velocity condition of the aircraft changing at a rate in excess of a predetermined threshold value.

3. The combination defined by claim 2 in which the velocity responsive means includes an airspeed sensor responsive to the airspeed of the aircraft in flight, and the control means includes motor means controlled by the airspeed sensor and driven at speeds proportional to rate of change in the sensed airspeed, a rate generator driven by the motor means and providing an output voltage varying directly with the speed of the motor means and thereby with the rate of change in the sensed airspeed, and means operatively connecting the output of the rate generator to cutoff means to render the cutoff means effective upon the sensed airspeed of the aircraft changing at a rate exceeding a predetermined threshold value.

4. The combination defined by claim 2, in which the velocity responsive means includes a direction sensor responsive to the direction of flight of the aircraft, and the control means includes motor means controlled by the direction sensor and driven at a speed proportional to rate of change in the sensed direction, a rate generator driven by the motor means and providing an output voltage varying directly with the speed of the motor means and thereby with the rate of change in the sensed direction of flight of the aircraft, and means operatively connecting the output of the rate generator to the cutoff means to render the cutoff means effective upon the sensed direction of flight of the aircraft changing at a rate exceeding a predetermined theshold value.

5. The combination defined by claim 2, in which the velocity responsive means includes a condition sensor responsive to flight conditions of the aircraft, and the control means includes motor means controlled by the condition sensor and driven at speeds proportional to rate of change in the sensed condition, a rate generator driven by the motor means and providing a voltage output varying directly with the speed of the motor means and thereby with the rate of change in the sensed condition, means operatively connecting the output of the rate generator between the condition sensor and the motor means to stabilize the control of the motor means by the condition sensor, and other means operatively connecting the output of the rate generator to the cutoff means to render the cutoff means effective upon the sensed flight condition of the aircraft changing at a rate exceeding a predetermined threshold value.

6. In an aircraft having a vertical gyroscope, a control system for the vertical gyroscope including means for producing erection of the gyroscope about a pitch axis of the gyroscope during flight of the aircraft, said control system comprising means for sensing a dynamic vertical error in the gyroscope about the pitch axis and effecting a signal in accordance with said error, a torquer motor, means operably connecting the vertical error sensing means to the torquer motor, the torquer motor being controlled through said connecting means by the error signal effected by the vertical error sensing means for erecting the gyroscope about the pitch axis; the improvement comprising means for generating a signal proportional to rate of change in airspeed of the aircraft in fore-aft flight senses, and other means operated by the rate of change in airspeed signal for rendering the connecting means ineffective upon the rate signal exceeding a threshold value.

7. In an aircraft having a vertical gyroscope, a control system for the vertical gyroscope including means for producing erection of the gyroscope about a pitch axis of the gyroscope during flight of the aircraft, said control system comprising means for sensing a dynamic vertical error in the gyroscope about the pitch axis and effecting a signal in accordance with said error, a torquer motor, means operably connecting the vertical error sensing means to the torquer motor, the torquer motor being controlled through said connecting means by the error signal effected by the vertical error sensing means for erecting the gyroscope about the pitch axis; the improvement comprising means for generating a signal proportional to rate of change in airspeed of the aircraft, other means operated by the rate of change in airspeed signal for rendering the connecting means ineffective upon the rate signal exceeding a threshold value, the rate of change in airspeed signal generating means including means for sensing true airspeed of the aircraft and to effect a signal proportional to said true airspeed of the aircraft, a servo repeater system responsive to said airspeed signal, said servo repeater system including a servo motor driven at a speed proportional to the rate of change in the airspeed signal, a rate generator driven by the servo motor at a speed varying with the speed of the servo motor and generating an output voltage proportional to the driven speed of the rate generator and thereby proportional to the rate of change in the airspeed of the aircraft, means for applying the voltage generated by the rate generator in one sense to stabilize the servo repeater system and in another sense to operate the other means so as to render the means operably connecting the vertical error sensing means to the torquer motor ineffective upon the voltage generated by the rate generator exceeding a threshold value.

8. In an aircraft having a vertical gyroscope, a control system for the vertical gyroscope including means for producing erection of the gyroscope about a bank axis of the gyroscope during flight of the aircraft, said control system comprising means for sensing a dynamic vertical error in the gyroscope about the bank axis and effecting a signal in accordance with said error, a torquer motor, means operably connecting the vertical error sensing means to the torquer motor, the torquer motor being controlled through said connecting means by the error signal effected by the vertical error sensing means for erecting the gyroscope about the bank axis; the improvement comprising means for generating a signal proportional to rate of change in heading of the aircraft, other means operated by the rate of change in heading signal for rendering the connecting means ineffective upon the rate signal exceeding a threshold value, the rate of change in heading signal generating means including means for sensing direction of flight of the aircraft and to effect a signal proportional to change in heading of the aircraft, a heading servo repeater system responsive to said change in heading signal, said servo repeater system including a servo motor driven at a speed proportional to rate of change in the heading of the aircraft, a rate generator driven by the servo motor at a speed varying with the speed of the servo motor and generating an output voltage proportional to the driven speed of the rate generator and thereby proportional to the rate of change in the heading of the aircraft, means for applying the voltage generated by the rate generator in one sense to stabilize the heading servo repeater system and in another sense to operate the other means so as to render the means for operably connecting the vertical error sensing means to the torquer motor ineffective upon the output voltage generated by the rate generator exceeding a threshold value.

9. In an aircraft having a vertical gyroscope, a control system for the vertical gyroscope including means for producing erection of the gyroscope about pitch and bank axes of the gyroscope during flight of the aircraft, said control system comprising first means for sensing a dynamic vertical error in the gyroscope about the pitch axis and to generate an error signal dependent upon the sense of the vertical error about the pitch axis, second means for sensing a dynamic vertical error in the gyroscope about the bank axis and to generate an error signal dependent upon the sense of the vertical error about the bank axis, a first torquer motor, a second torquer motor, third means operably connecting the first means to the first torquer motor, the first torquer motor being controlled through the third means by the error signal generated by the first means for erecting the gyroscope about the pitch axis, fourth means operably connecting the second means to the second torquer motor, the second torquer motor being controlled through the fourth means by the error signal generator by the second means for erecting the gyroscope about the bank axis; the improvement comprising means for generating a signal proportional to rate of change in airspeed of the aircraft in a fore-aft sense, means operated by the rate of change in airspeed signal for rendering the third connecting means ineffective upon the rate of change in airspeed signal exceeding a threshold value, means for generating a signal proportional to rate of change in heading of the aircraft in a turning maneuver, and means operated by the rate of change in heading signal for rendering the fourth connecting means ineffective upon the rate of change in heading signal exceeding a threshold value.

10. The combination defined by claim 9 in which the means for generating the rate of change in airspeed signal includes a true airspeed sensor for generating a first signal voltage proportional to a change in said sensed airspeed, a velocity servo repeater system responsive to said first signal voltage, said velocity servo repeater system including a first servo motor driven at a speed proportional to the first signal voltage, a first rate generator driven by the servo motor at a speed varying with the speed of the first servo motor to generate an output voltage proportional to the speed of the first rate generator and thereby proportional to the rate of change in the airspeed of the aircraft, means for applying the output voltage of the first rate generator in one sense to stabilize the velocity servo repeater system and in another sense to operate the means to render ineffective the third connecting means upon the output voltage of the first rate generator exceeding a threshold value, and the means for generating the signal proportional to rate of change in heading of the aircraft includes means for sensing the direction of flight of the aircraft for generating a second signal voltage proportional to a change in the sensed heading of the aircraft, a heading servo repeater system responsive to said second signal voltage, said heading servo repeater system including a second servo motor driven at a speed proportional to said second signal voltage, a second rate generator driven by the second servo motor at a speed varying with the speed of the second servo motor to generate an output voltage proportional to the speed of the second rate generator and thereby proportional to the rate of change in the heading of the aircraft, means for applying the output voltage of the second rate generator in one sense to stabilize the heading servo repeater system and in another sense to operate the means to render the fourth connecting means ineffective upon the output voltage generated by the second rate generator exceeding a threshold value.

11. In an aircraft having a vertical gyroscope, a control system for the vertical gyroscope including means for producing erection of the gyroscope about a pitch axis during flight of the aircraft, said control system comprising means for generating a signal proportional to rate of change in airspeed of the aircraft in fore-aft flight senses, and means responsive to the rate signal for rendering the means for producing erection of the gyroscope ineffective upon the rate of change of airspeed of the aircraft exceeding a threshold value.

12. In an aircraft having a vertical gyroscope a control system for the vertical gyroscope including means for producing erection of the gyroscope about pitch and bank axes of the gyroscope during flight of the aircraft, said control system comprising means for generating a signal proportional to rate of change of airspeed of the aircraft in fore-aft flight senses, means operated by said rate of change of airspeed signal for rendering the means for producing the erection of the gyroscope about the pitch axes ineffective upon the rate of change of the airspeed of the aircraft exceeding a threshold value, other means for generating a signal proportional to rate of change in heading of the aircraft, and means operated by said rate of change of heading signal for rendering the means for producing an erection of the gyroscope about the bank axis ineffective upon the rate of change of heading of the aircraft exceeding a threshold value.

13. A method for controlling during flight of an aircraft a system for erecting a gyroscope in the aircraft about a pitch axis thereof, including the steps of sensing airspeed of the aircraft in a fore-aft flight sense, generating an electrical signal voltage as a derivative of rate of change of the sensed airspeed of the aircraft, and upon said signal voltage exceeding a predetermined threshold value rendering the system for erecting the gyroscope about the pitch axis ineffective.

14. A method for controlling during flight of an aircraft a system for erecting a gyroscope in the aircraft about a bank axis thereof, including the steps of sensing heading of the aircraft in a turning maneuver, generating an electrical signal voltage as a derivative of rate of change of the sensed heading angle of the aircraft, and upon said signal voltage exceeding a predetermined threshold value rendering the system for erecting the gyroscope about the bank axis ineffective.

15. A method for controlling during flight of an aircraft a system for erecting a gyroscope in the aircraft about pitch and bank axes thereof, including the steps of sensing airspeed of the aircraft in a fore-aft flight sense, generating an electrical signal voltage as a derivative of rate of change of the sensed airspeed of the aircraft, upon said signal voltage exceeding a predetermined threshold value rendering the system for erecting the gyroscope about the pitch axis ineffective, further sensing heading of the aircraft in a turning maneuver, generating an electrical signal voltage as a derivative of rate of change of the heading angle of the aircraft, and upon said last mentioned signal voltage exceeding a predetermined threshold value rendering the system for erecting the gyroscope about the bank axis ineffective.

16. A method for eliminating errors in erection of a gyroscope about pitch and bank axes thereof due to changes in velocity of an aircraft during flight maneuvers thereof, comprising the steps of establishing threshold values for rendering ineffective the erection of the gyroscope about both pitch and bank axes, preventing erection of the gyroscope about the pitch axis upon fore-aft accelerations of the aircraft exceeding the established threshold value, and preventing erection of the gyroscope about said bank axis upon rate of change of the heading of the aircraft exceeding the established threshold value.

References Cited

UNITED STATES PATENTS 2,973,651  3/1961  Swarts et al. _____ 74—5.41
2,995,039  8/1961  Wieser _____ 74—5.41
3,276,269  10/1966  Whitehead _____ 74—5.41

FRED C. MATTERN, Jr., Primary Examiner

MANUEL ANTONAKAS, Assistant Examiner

U.S. Cl. X.R.

74—5.8